No. 840,143. PATENTED JAN. 1, 1907.
W. D. LEONARD.
NUT LOCK.
APPLICATION FILED APR. 27, 1906.

Witnesses
W. Rees Edelen.
John S. Powers

Inventor
W. D. Leonard.
By Shepherd & Parker
Attorneys

UNITED STATES PATENT OFFICE.

WILLIAM DIETZ LEONARD, OF YORK, PENNSYLVANIA.

NUT-LOCK.

No. 840,143.  Specification of Letters Patent.  Patented Jan. 1, 1907.

Application filed April 27, 1906. Serial No. 313,949.

*To all whom it may concern:*

Be it known that I, WILLIAM DIETZ LEONARD, a citizen of the United States, residing at York, in the county of York and State of Pennsylvania, have invented certain new and useful Improvements in Nut-Locks, of which the following is a specification.

This invention relates to new and useful improvements in nut-locks, and particularly pertains to a type in which means are carried by the nut for engaging the threads of the bolt to effect an interlocked relation therewith and prevent the rotation of the nut.

In connection with a nut-lock of this type the present invention aims to provide novel means for preventing the loss or displacement of the nut-locking element due to the constant vibrations and the varying atmospheric conditions to which such structures are subjected.

The detailed construction will appear in the course of the following description, reference being had to the accompanying drawings, forming a part of this specification, like numerals designating like parts throughout the several views, wherein—

Figure 1:
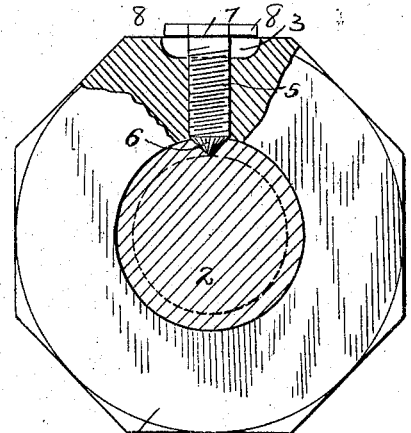
Figure 2:
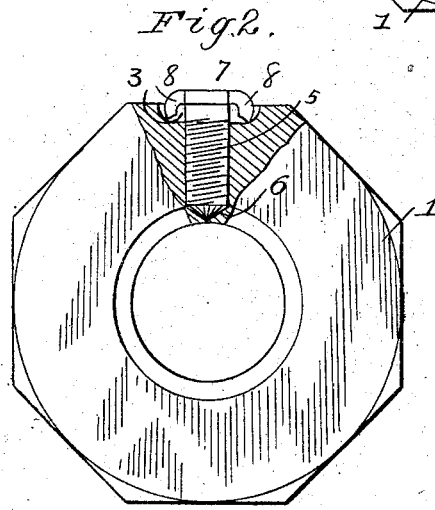
Figure 3:
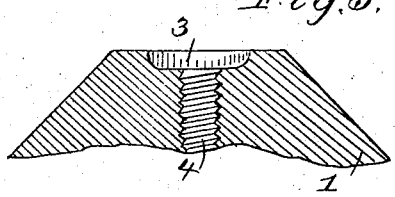
Figure 4:
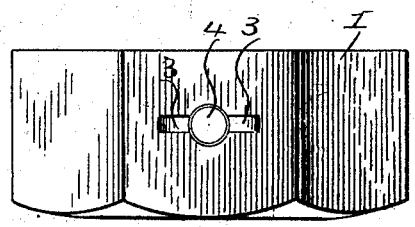
Figure 5:
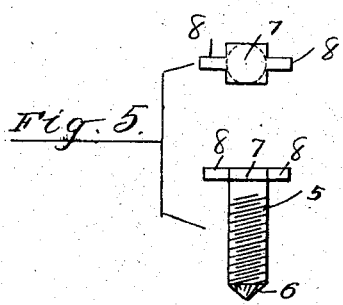

Figure 1 is a front elevation, partly in section, showing the arrangement of the nut-locking element. Fig. 2 is a similar view showing said element in its engaged position. Fig. 3 is a fragmentary longitudinal section of the nut. Fig. 4 is a top plan view looking toward one of the flat faces of the nut, and Fig. 5 is a view illustrating in top plan and side elevation the nut-locking element.

In the practical embodiment of my invention the nut 1 is of conventional form and is threaded upon a bolt 2. One of the side faces of said nut is provided with an elongated recess 3, which communicates at a point central thereof with a threaded opening following a radial line through to the inner circumference of the nut 1. This threaded opening is designated by the numeral 4 and is for the reception of a nut-locking element, which comprises a threaded pin 5, formed with a pointed end 6, designed to bite the threads of the bolt. The pin 5 is formed with a squared head 7 to facilitate its introduction into the opening 4, and on opposite sides of said head 7 are alined extensions 8, which, together with said head 7, occupy the longitudinal space of the recess 3, as is shown in Fig. 1.

When the pin 5 has been screwed into the opening 4 to the limit of its movement—that is, until the pointed end 6 thereof bites into the threads of the bolt—the pin is locked in such position by bending the extensions 8 by hammering or with a suitable tool into the position shown in Fig. 2, wherein said extensions lie wholly within the space between the walls of the recess 3.

Having fully described my invention, I claim—

In a nut-lock, the combination of a flat-sided nut formed with a radial threaded opening and alined recesses in its flat side adjacent to and on each side of said opening and communicating therewith, of a locking element for positive engagement with the bolt comprising a threaded pin having a pointed end projected through said opening and engaging said bolt, said pin being formed with a squared head and with integral alined projections on opposite sides of said head designed to be bent downwardly into said recesses for positive engagement therewith.

In testimony whereof I affix my signature in presence of two witnesses.

WILLIAM DIETZ LEONARD.

Witnesses:
J. EDW. RAMER,
J. WARREN LOVETT.